(12) United States Patent
Nagata et al.

(10) Patent No.: US 10,927,038 B2
(45) Date of Patent: Feb. 23, 2021

(54) GLASS ARTICLE

(71) Applicant: AGC Inc., Chiyoda-ku (JP)

(72) Inventors: Takashi Nagata, Haibara-gun (JP); Hirofumi Yamamoto, Haibara-gun (JP)

(73) Assignee: AGC Inc., Chiyoda-ku (JP)

( * ) Notice: Subject to any disclaimer, the term of this patent is extended or adjusted under 35 U.S.C. 154(b) by 100 days.

(21) Appl. No.: 16/168,975

(22) Filed: Oct. 24, 2018

(65) Prior Publication Data

US 2019/0055160 A1  Feb. 21, 2019

Related U.S. Application Data

(63) Continuation of application No. PCT/JP2017/017038, filed on Apr. 28, 2017.

(30) Foreign Application Priority Data

May 16, 2016 (JP) .............................. JP2016-097765

(51) Int. Cl.
  *C03C 17/34* (2006.01)
  *G02B 1/115* (2015.01)
  *G02B 5/20* (2006.01)

(52) U.S. Cl.
  CPC .......... *C03C 17/3417* (2013.01); *G02B 1/115* (2013.01); *C03C 2217/218* (2013.01);
  (Continued)

(58) Field of Classification Search
  CPC ............ C03C 17/3417; C03C 2217/73; C03C 2217/734; C03C 2217/74;
  (Continued)

(56) References Cited

U.S. PATENT DOCUMENTS

2009/0009691 A1  1/2009  Shiratori et al.

FOREIGN PATENT DOCUMENTS

CN  101146748 A  3/2008
EP  1 905 746 A1  4/2008
(Continued)

OTHER PUBLICATIONS

Translation of JP2005031297. (Year: 2005).*
(Continued)

*Primary Examiner* — Catherine A. Simone
(74) *Attorney, Agent, or Firm* — Oblon, McClelland, Maier & Neustadt, L.L.P.

(57) ABSTRACT

There is provided a glass article using an ultraviolet absorbing glass substrate, the glass article suppressing solarization and exhibiting a high visible light transmittance. A glass article, comprising a glass substrate absorbing light at a wavelength of 250 to 400 nm from the surface and an antireflection film provided on at least one surface of the glass substrate, wherein the glass article has an ultraviolet irradiation degradation degree (X) of 1.5% or less, wherein the ultraviolet irradiation degradation degree (X) is $T_0-T_1$, where $T_0$ is an average transmittance of light at the wavelength of 250 to 400 nm from a surface of the antireflection film in an initial state, and $T_1$ is an average transmittance of light at the wavelength of 250 to 400 nm from the surface of the antireflection film after irradiating the surface of the antireflection film with ultraviolet rays for one hour.

7 Claims, 6 Drawing Sheets

(52) U.S. Cl.
CPC .... *C03C 2217/73* (2013.01); *C03C 2217/734* (2013.01); *C03C 2217/74* (2013.01); *G02B 5/205* (2013.01); *Y10T 428/24942* (2015.01)

(58) Field of Classification Search
CPC ... C03C 2217/218; G02B 1/115; G02B 5/205; Y10T 428/24942; B32B 17/06
See application file for complete search history.

(56) References Cited

FOREIGN PATENT DOCUMENTS

| | | |
|---|---|---|
| JP | 10-291839 | 11/1998 |
| JP | 2002-293571 | 10/2002 |
| JP | 2005-31297 | 2/2005 |
| KR | 10-2007-0117683 | 12/2007 |
| TW | 200642982 | 12/2006 |
| WO | WO 2006/103942 A1 | 10/2006 |
| WO | WO 2015/087812 A1 | 6/2015 |

OTHER PUBLICATIONS

Translation of JPH10291839. (Year: 1998).*
International Search Report dated Jul. 11, 2017 in PCT/JP2017/017038, filed on Apr. 28, 2017 (with English Translation).
Written Opinion dated Jul. 11, 2017 in PCT/JP2017/017038, filed on Apr. 28, 2017.

* cited by examiner

GLASS ARTICLE

CROSS-REFERENCE TO RELATED APPLICATIONS

This application is a continuation of prior International Application No. PCT/JP2017/017038, filed on Apr. 28, 2017 which is based upon and claims the benefit of priority from Japanese Patent Application No. 2016-097765, filed on May 16, 2016; the entire contents of all of which are incorporated herein by reference.

TECHNICAL FIELD

The present invention relates to a glass article, and particularly relates to a glass article using a glass substrate having absorption in an ultraviolet region, the glass article suppressing solarization and exhibiting a high visible light transmittance.

BACKGROUND

A cover glass is attached to a light emitting device or the like which has a light source. The cover glass is required to transmit light of the light source, and thus it is demanded to have a high transmittance (refer to Patent Reference 1; International Publication No. WO 2015/087812, for example).

However, when using the cover glass, since the glass is arranged to a part which is brought into contact with the outside, there is a possibility that light in an ultraviolet region shines on the glass. If an impurity such as iron is contained in the glass, a phenomenon that the glass is colored by the impurity because of the irradiation of light in the ultraviolet region, which is so-called solarization, sometimes occurs. If the glass is colored, the visible light transmittance may be lowered when compared to the state before the coloring occurs. Further, as a period of time during which light shines on the glass becomes longer, the degradation of the glass progresses more, which is not preferable in terms of quality.

SUMMARY

In order to prevent the degradation caused by the coloring of the glass, there is a need to suppress mixing of the impurity. However, when the mixing of the impurity from a glass raw material or process is suppressed, a manufacturing cost increases, which is a problem.

The present invention has an object to provide a glass article using a glass substrate having absorption in an ultraviolet region, the glass article suppressing solarization and exhibiting a high visible light transmittance.

A glass article of the present invention is characterized in that it is a glass article having a glass substrate and an antireflection film provided on at least one surface of the glass substrate, in which the glass substrate absorbs light at a wavelength of 250 to 400 nm which is incident from the surface, and the glass article has the following ultraviolet irradiation degradation degree (X) of 1.5% or less. The ultraviolet irradiation degradation degree (X) is $T_0 - T_1$, where $T_0$ is an average transmittance of light at the wavelength of 250 to 400 nm which is incident from a surface of the antireflection film of the glass article in an initial state, and $T_1$ is an average transmittance of light at the wavelength of 250 to 400 nm which is incident from the surface of the antireflection film of the glass article after irradiating the surface of the antireflection film with ultraviolet rays for one hour by using a 400 W high-pressure mercury lamp with a main wavelength of 253.7 nm facing the surface of the antireflection film of the glass article at a distance of 20 cm.

It is preferable that the glass article of the present invention has an average transmittance of light at the wavelength of 250 to 400 nm which is incident from the surface of the antireflection film of 40% or less, and has an average reflectance of light at the wavelength of 250 to 400 nm which is incident from the surface of the antireflection film of 15% or more.

It is preferable that in the glass article of the present invention, the glass substrate has a lower average transmittance of light at the wavelength of 250 to 400 nm than an average transmittance of light at a wavelength of 400 to 700 nm, and an average transmittance of light at the wavelength of 250 to 400 nm of 70% or less, in the transmittances of lights which are incident from the surface, and the glass article has an average reflectance of light at the wavelength of 400 to 700 nm which is incident from the surface of the antireflection film of 6% or less.

It is preferable that in the glass article of the present invention, the antireflection film is an optical multilayer film. Further, it is preferable that the number of layers of the optical multilayer film is eight or less.

It is preferable that in the glass article of the present invention, the antireflection film is an optical multilayer film including an alternately-laminated part of a $SiO_2$ layer and a $Nb_2O_5$ layer. Further, it is preferable that a thickness of the antireflection film is 200 to 450 nm.

According to the present invention, it is possible to provide a glass article using a glass substrate having absorption in an ultraviolet region, the glass article suppressing solarization and exhibiting a high visible light transmittance.

MODES FOR CARRYING OUT THE INVENTION

Hereinafter, embodiments of the present invention will be described. Note that the present invention is not limited to these embodiments, and these embodiments can be changed or modified without departing from the gist and the scope of the present invention.

Figure 1:
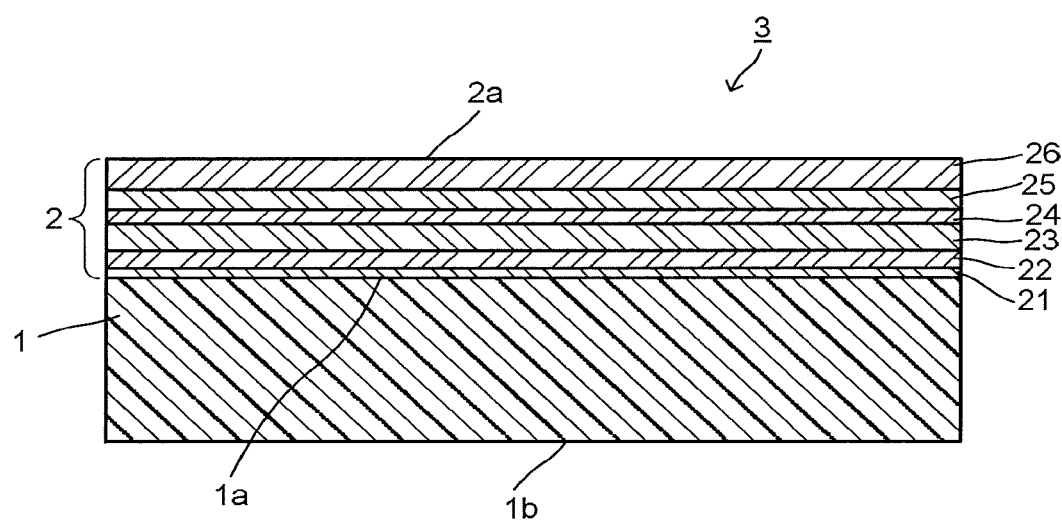
FIG. 1 is a sectional view illustrating one example of an embodiment of a glass article of the present invention.

FIG. 1 is a sectional view illustrating one example of an embodiment of a glass article of the present invention. A glass article 3 has a glass substrate 1 and an antireflection film 2 provided on one principal surface 1a side of the glass substrate 1.

The glass substrate 1 used for the glass article 3 absorbs light at a wavelength of 250 to 400 nm which is incident from the principal surface 1a. Further, the above-described ultraviolet irradiation degradation degree (X) in the glass article 3 is 1.5% or less.

In the present specification, the description that the glass substrate, the glass article and the like (also referred to as "glass and the like", hereinafter) absorb light in a specific wavelength region, indicates a case that, when the light at the specific wavelength described above is irradiated from one principal surface side of the glass and the like, a total of an average transmittance measured on the other principal surface side and an average reflectance measured at the principal surface of the irradiation side is less than 100%.

In the present specification, the transmittance of light at the specific wavelength, for example, 250 to 700 nm in the glass substrate and the glass article can be measured by a general spectrophotometer, which is, for example, U4100 manufactured by Hitachi, Ltd., or the like. Further, the reflectance of light at the specific wavelength, for example, 250 to 700 nm at a predetermined surface of the glass article and the glass substrate can be measured by a normal spectrophotometer. As the spectrophotometer, there can be cited, for example, FE3000 manufactured by Otsuka Electronics Co., Ltd., U4100 manufactured by Hitachi, Ltd., or the like.

The reason why the degradation degree in the ultraviolet irradiation is defined as the ultraviolet irradiation degradation degree (X) in the present invention, is as follows. Normally, in an accelerating test in which the glass and the like are exposed to the vicinity of a strong ultraviolet source, it is possible to check a coloring tendency (whether the glass and the like are easily colored or not) in one hour. Therefore, by the above-described method, namely, the method in which the 400 W high-pressure mercury lamp with the main wavelength of 253.7 nm is arranged to face the surface of the glass and the like at a distance of 20 cm, the surface of the glass and the like is irradiated with ultraviolet rays for one hour by using the high-pressure mercury lamp, and the transmittances before and after the irradiation are compared, it is possible to roughly understand an influence of a reduction in the transmittance at a time of using an actual product for a long time.

Note that the reduction in the transmittance caused by the coloring due to the solarization becomes the maximum in the ultraviolet region of the wavelength of 250 to 400 nm, so that in the present invention, an average transmittance at the wavelength of 250 to 400 nm is set as a measure of evaluation. Specifically, the evaluation can be set to an index of the reduction in the transmittance caused by the coloring due to the solarization in not only the ultraviolet region but also a visible region. Further, the surfaces of the glass and the like to which ultraviolet rays are irradiated in the above description are a surface 2a on the antireflection film 2 side of the glass article 3, and a principal surface 1a of the glass substrate 1, for example.

In the aforementioned evaluation in the present invention as described above, if the ultraviolet irradiation degradation degree (X) is 1.5% or less, the glass and the like can be evaluated as glass and the like having high solarization resistance. If the ultraviolet irradiation degradation degree (X) of the glass and the like is 1.5% or less, for example, it is possible to suppress darkening of transmitted light of a light emitting member which uses the glass and the like to a degree at which a user does not recognize the darkening, and it is possible to maintain a certain transmittance for a long period.

In the present specification, a test conducted by irradiating ultraviolet rays for one hour by using a 400 W high-pressure mercury lamp with a main wavelength of 253.7 nm facing the surface of the glass and the like at a distance of 20 cm, is sometimes referred to as an "ultraviolet irradiation test". In the present specification, a wavelength region of 400 to 700 nm is sometimes referred to as a "visible region", and a wavelength region of 250 to 400 nm is sometimes referred to as an "ultraviolet region", unless otherwise noted.

(Glass substrate) In the present embodiment, the glass substrate 1 has two principal surfaces 1a and 1b which face each other, and the antireflection film 2 is formed on the principal surface 1a side. The glass substrate 1 has a property of absorbing light at the wavelength of 250 to 400 nm (the ultraviolet region) which is incident from the principal surface 1a. It is preferable that in the glass substrate 1, a transmittance measured on the principal surface 1b side regarding light in the ultraviolet region which is incident from the principal surface 1a is 70% or less on the average, and an average reflectance measured on the principal surface 1a side regarding the light in the ultraviolet region which is incident from the principal surface 1a is 10% or less, for example. In this case, the glass substrate 1 is a glass substrate which absorbs light in the ultraviolet region.

In the present specification, the transmittance regarding the glass substrate 1 indicates a transmittance of light which is incident from the principal surface 1a of the glass substrate 1 measured on the principal surface 1b side of the glass substrate 1, unless otherwise noted. The transmittance regarding the glass article 3 indicates a transmittance of light which is incident from the surface 2a of the antireflection film 2 measured on the principal surface 1b side of the glass substrate 1. Further, the reflectance regarding the glass substrate 1 indicates a reflectance of light which is incident from the principal surface 1a of the glass substrate 1. The reflectance regarding the glass article 3 indicates a reflectance of light which is incident from the surface 2a of the antireflection film 2. In the present specification, an angle at which the light is incident is an angle which coincides with a normal of a plane of incidence, namely, an incident angle of 0°, unless otherwise noted.

The average transmittance in the ultraviolet region of the glass substrate 1 is preferably 70% or less. Although a lower limit of the average transmittance in the ultraviolet region is not particularly limited, when a glass article is used in a manner that a glass substrate side thereof is joined to another member by using an ultraviolet curable resin and in order to easily peel off the glass article, for example, the lower limit is preferably 10%, and more preferably 20%. The average reflectance of light in the ultraviolet region of the glass substrate 1 is preferably 10% or less, and more preferably 8% or less.

The average transmittance of light in the visible region of the glass substrate 1 is preferably higher than the average transmittance in the ultraviolet region. The average transmittance of light in the visible region of the glass substrate 1 is preferably 75% or more, more preferably 80% or more, still more preferably 85% or more, and even more preferably 90% or more.

A composition of the glass that configures the glass substrate 1 is not particularly limited as long as it exhibits the property of absorbing light in the ultraviolet region. As the composition of glass as described above, for example, a composition of glass containing a very small amount of an ultraviolet region absorbing component being a main factor of absorbing light in the ultraviolet region, to a degree at which a large influence is not exerted on the transmittance of light in the visible region, is preferable. When the glass contains the ultraviolet region absorbing component, in the transmittances of light in the visible region, the transmittance of light at a wavelength of the vicinity of 400 to 500 nm close to the ultraviolet region tends to be lower than the transmittance of light in the other region in the visible region. Therefore, the content of the ultraviolet region absorbing component in the glass is preferably a content of a degree exerting no large influence on the transmittance of light at the wavelength of the vicinity of 400 to 500 nm in particular.

From the above-described point of view, the content of the ultraviolet region absorbing component in the glass is preferably 200 ppm or less with respect to 100 mass % of the glass composition in terms of an oxide excluding the ultraviolet region absorbing component. Note that when such a content is employed, the ultraviolet region absorbing component in the glass is normally a component which is not intentionally blended, namely, an impurity component, and exists in an amount of approximately 10 ppm or more with respect to 100 mass % of the glass composition in terms of an oxide excluding the ultraviolet region absorbing component. As an impurity component to be the ultraviolet region absorbing component, there can be concretely cited iron, rhodium, platinum, and the like. Among the above, iron is not preferable since it has a characteristic of absorbing light at the wavelength of the vicinity of 400 to 500 nm close to the ultraviolet region in particular, in the visible region. Note that the content of the ultraviolet region absorbing component described above is a mass fraction in terms of an oxide of iron, rhodium, platinum, and the like.

The glass substrate used in the present invention inevitably contains the component which absorbs light at the wavelength of 250 to 400 nm (the ultraviolet region), resulting in that the ultraviolet irradiation degradation degree (X) normally exceeds 1.5%. Further, in the glass substrate configured by the glass containing the ultraviolet region absorbing component in the range of the content described above, the average transmittance of light in approximately the ultraviolet region is 70% or less, the average reflectance of light in approximately the ultraviolet region is 10% or less, and the ultraviolet irradiation degradation degree (X) is about greater than 1.5% and 5% or less.

As the composition of the glass that configures the glass substrate 1, there can be cited, for example, soda lime glass, borosilicate glass, non-alkali glass, aluminosilicate glass, non-alkali aluminosilicate glass or the like containing the very small amount of ultraviolet region absorbing component described above, and the non-alkali aluminosilicate glass is preferable.

The glass which configures the glass substrate of one embodiment of the present invention preferably has the following composition represented by mass % in terms of an oxide, as the glass composition excluding the ultraviolet region absorbing component:
$SiO_2$: 50% to 75%;
$Al_2O_3$: 6% to 16%;
$B_2O_3$: 0% to 15%;
MgO: 0% to 15%;
CaO: 0% to 13%;
SrO: 0% to 11%; and
BaO: 0% to 9.5%.

Hereinafter, the composition of glass according to the embodiment will be described using a content expressed in mass % in terms of an oxide, unless otherwise stated.

$SiO_2$ is a component which forms a skeletal structure of the glass. If a content of $SiO_2$ is 50% or more, heat resistance, chemical durability, and weather resistance become good. If the content of $SiO_2$ is 75% or less, a viscosity when melting the glass does not become too high, which provides good meltability. The content of $SiO_2$ is preferably 60% or more, and more preferably 64% or more. Further, the content of $SiO_2$ is preferably 70% or less, and more preferably 68% or less.

If a content of $Al_2O_3$ is 6% or more, the weather resistance, the heat resistance, and the chemical durability become good, and the Young's modulus becomes high. If the content of $Al_2O_3$ is 16% or less, the viscosity when melting the glass does not become too high, which provides good meltability, and it becomes difficult to cause devitrification. The content of $Al_2O_3$ is preferably 8% or more, and more preferably 11% or more. Further, the content of $Al_2O_3$ is preferably 14% or less.

Although $B_2O_3$ is not an essential component, when it is contained, the viscosity when melting the glass does not become too high, which provides good meltability, and it becomes difficult to cause the devitrification. If a content of $B_2O_3$ is 15% or less, it is possible to increase a glass transition temperature, which increases the Young's modulus. The content of $B_2O_3$ is preferably 3% or more. Further, the content of $B_2O_3$ is preferably 12% or less, and more preferably 6% or less.

Although MgO is not an essential component, when it is contained, the viscosity when melting the glass does not become too high, which provides good meltability, the weather resistance is improved, and the Young's modulus is increased. If a content of MgO is 15% or less, it becomes difficult to cause the devitrification. The content of MgO is preferably 4% or more, and more preferably 6% or more. Further, the content of MgO is preferably 10% or less, more preferably 9.5% or less, and still more preferably 9% or less.

Although CaO is not an essential component, when it is contained, the viscosity when melting the glass does not become too high, which provides good meltability, and the weather resistance is improved. If a content of CaO is 13% or less, it becomes difficult to cause the devitrification. The content of CaO is preferably 4% or more. Further, the content of CaO is preferably 10% or less, and more preferably 8% or less.

Although SrO is not an essential component, when it is contained, the viscosity when melting the glass does not become too high, which provides good meltability, and the weather resistance is improved. If a content of SrO is 11% or less, it becomes difficult to cause the devitrification. The content of SrO is preferably 0.5% or more. Further, the content of SrO is preferably 8% or less, and more preferably 3% or less.

Although BaO is not an essential component, when it is contained, the viscosity when melting the glass does not become too high, which provides good meltability, and the weather resistance is improved. If a content of BaO is 9.5% or less, it becomes difficult to cause the devitrification. The content of BaO is preferably 3% or less, and more preferably 2% or less.

It is also possible that $SnO_2$, $SO_3$, Cl, F, and the like, for example, are contained as clarifying agents in the above-described glass.

It is also possible that ZnO, $Li_2O$, $WO_3$, $Nb_2O_5$, $V_2O_5$, $Bi_2O_3$, $MoO_3$, $P_2O_5$, $Ga_2O_3$, $I_2O_5$, $In_2O_5$, $Ge_2O_5$, and the like, for example, are contained in the above-described glass in order to improve the weather resistance, the meltability, the devitrification property, an ultraviolet shielding property, an infrared shielding property, an ultraviolet transmission property, an infrared transmission property, and the like.

In order to improve the chemical durability of the glass, it is also possible that $ZrO_2$, $Y_2O_3$, $La_2O_3$, $TiO_2$, and $SnO_2$ are contained in the above-described glass in a total amount of 2% or less, they are preferably contained in a total amount of 1% or less, and more preferably contained in a total amount of 0.5% or less. Among the above, $Y_2O_3$, $La_2O_3$, and $TiO_2$, contribute to the improvement of the Young's modulus of the glass as well.

When an environmental burden is taken into consideration, it is preferable that the above-described glass does not substantially contain $As_2O_3$ and $Sb_2O_3$. Besides, when float forming in a stabilized manner is taken into consideration, it is preferable that ZnO is not substantially contained.

The glass substrate of one embodiment of the present invention is configured by the glass having the composition in which the above-described very small amount of ultraviolet region absorbing component is added to 100 mass % of the non-alkali aluminosilicate glass with the composition as described above.

A shape of the glass substrate 1 is not particularly limited, and it may be a block shape, a plate shape, or a film shape. Further, the glass substrate 1 may be formed in an arbitrary shape by a metal mold or the like.

When the glass substrate 1 has a plate shape or a film shape, a thickness of the glass substrate 1 is appropriately adjusted in accordance with the application of the glass article 3.

(Antireflection Film)

The antireflection film 2 is formed on one principal surface 1a of the glass substrate 1, and has an antireflection function and a function of making the ultraviolet irradiation degradation degree (X) of the obtained glass article 3 to be 1.5% or less. Note that in the present specification, the antireflection function indicates a function of reducing the reflectance in the visible region. Specifically, the antireflection film 2 has a function of increasing the transmittance by reducing the reflectance when compared to that of the glass substrate 1, regarding the optical characteristic of the obtained glass article 3 with respect to light in the visible region.

In the present invention, the antireflection film 2 is formed on the surface 1a of the glass substrate 1 whose ultraviolet irradiation degradation degree (X) is greater than 1.5%, for example, to make the ultraviolet irradiation degradation degree (X) of the obtained glass article 3 to be 1.5% or less, and the ultraviolet irradiation degradation degree (X) of the glass article 3 is more preferably 1.0% or less, and still more preferably 0.5% or less.

The antireflection film 2 is not limited as long as it makes the ultraviolet irradiation degradation degree (X) to be 1.5% or less in the obtained glass article 3, and, it is preferably one having a reflectance in the ultraviolet region higher than that of the glass substrate 1 in the glass article 3.

Although the reflectance of the antireflection film 2 is not particularly limited, it is preferably lower than that of the glass substrate 1 regarding the optical characteristic of the obtained glass article 3 with respect to the light in the visible region. By lowering the reflectance of the glass substrate 1 with respect to the light in the visible region, it becomes possible to increase the transmittance.

In the glass article 3, an average reflectance (also referred to as "Rv", hereinafter) of light at the wavelength of 400 to 700 nm (the visible region) which is incident from the surface 2a of the antireflection film 2 is preferably 6% or less, more preferably 5% or less, and still more preferably 4.5% or less. Although a lower limit of the average reflectance of light in the visible region in the glass article 3 is not particularly limited, a lower limit of Rv is preferably 1%, and more preferably 1.5%, in order to provide a function as the antireflection film.

Here, when an average reflectance in the visible region in the glass substrate 1 is set to Rvg, a value (Rdv) as a result of subtracting Rv from Rvg is preferably 2.5% or more, and more preferably 3 to 4%. The larger the value of Rdv, the larger the transmittance of light in the visible region in the obtained glass article 3 when compared to a case of using only the glass substrate 1.

When an average transmittance in the visible region in the glass substrate 1 is set to Tvg, and an average transmittance of light in the visible region in the glass article 3, the light being incident on the glass article 3 from the surface of the antireflection film 2 is set to Tv, a value (Tdv) as a result of subtracting Tvg from Tv is preferably 1% or more, and more preferably 1.5 to 10%. Note that Tv is preferably 85% or more, and more preferably 90% or more.

In the glass article 3, an average transmittance (also referred to as "Tuv", hereinafter) of light at the wavelength of 250 to 400 nm (the ultraviolet region) which is incident from the surface 2a of the antireflection film 2 is preferably 40% or less, and an average reflectance (also referred to as "Ruv", hereinafter) of light in the ultraviolet region is preferably 15% or more.

The antireflection film 2 is provided on at least one surface (a surface used as a light transmissive surface) of the glass substrate 1. The glass article 3 illustrated in FIG. 1 is an example in which the antireflection film 2 is provided on one principal surface 1a of the mutually facing two principal surfaces 1a and 1b of the glass substrate 1. The antireflection film 2 may also be formed as the same film or different films on a plurality of surfaces according to need.

A configuration of the antireflection film 2 is not particularly limited as long as the film is formed on the surface of the glass substrate 1 and it can make the glass article 3 completely satisfy the conditions of the present invention. The antireflection film 2 may be a single layer film formed of only one layer, or an optical multilayer film formed by laminating two layers or more. Further, the antireflection film 2 may also be a film which additionally has another function such as, for example, supply of an infrared shielding property, an ultraviolet shielding property, an antifouling property, a dustproof property or the like, and improvement of durability, as long as it is formed on the surface of the glass substrate 1 and it can make the glass article 3 completely satisfy the conditions of the present invention.

When the antireflection film 2 is the optical multilayer film, the number of layers is preferably eight or less. If the number of layers of the optical multilayer film exceeds eight, there is a case where a manufacturing cost increases or it becomes difficult to apply the glass article 3 to a small-sized device or the like due to an increase in thickness of the entire glass article 3. The number of layers of the antireflection film 2 is more preferably six or less.

When the antireflection film 2 is the optical multilayer film, it is typically configured by a dielectric multilayer film formed by alternately laminating a dielectric film with a low refractive index (a low refractive index film) and a dielectric film with a high refractive index (a high refractive index film). The refractive index of the high refractive index film is preferably 1.6 or more, and more preferably 2.2 to 2.5. As a material of the high refractive index film, there can be cited $Ta_2O_5$, $TiO_2$, and $Nb_2O_5$, for example. Among the above, $Nb_2O_5$ is preferable from a point that the desired optical characteristic can be obtained when it is turned into the optical multilayer film.

Meanwhile, the refractive index of the low refractive index film is preferably less than 1.6, and more preferably 1.45 or more and less than 1.55. As a material of the low refractive index film, there can be cited $SiO_2$, $SiO_xN_y$, and the like, for example. It is preferable to employ $SiO_2$ from a point of reproducibility, stability, economic efficiency, and the like in a film formation property.

Specifically, when the antireflection film 2 is the optical multilayer film, it is preferably a film including an alternately-laminated part of a silicon oxide ($SiO_2$) layer and a niobium oxide ($Nb_2O_5$) layer. In the example illustrated in FIG. 1, the antireflection film 2 which the glass article 3 has is an optical multilayer film formed by laminating six layers to which reference numerals 21 to 26 are applied in the order from the glass substrate 1 side. The antireflection film 2 is configured by a $Nb_2O_5$ layer 21, a $SiO_2$ layer 22, a $Nb_2O_5$ layer 23, a $SiO_2$ layer 24, a $Nb_2O_5$ layer 25, and a $SiO_2$ layer 26, for example, in the order from the principal surface 1a side of the glass substrate 1.

The antireflection film 2 may also be configured by five layers of $SiO_2$ layer/$Nb_2O_5$ layer/$SiO_2$ layer/$Nb_2O_5$ layer/$SiO_2$ layer, in the order from the principal surface 1a side of the glass substrate 1. The laminated structure of the antireflection film 2 can be appropriately changed according to demanded physical properties.

When the antireflection film 2 is the optical multilayer film, a thickness of each layer (a film thickness per one layer) can be set to 5 nm to 200 nm. By appropriately adjusting the material (refractive index) and the film thickness of each layer, the order of lamination on the glass substrate 1, and the like of the antireflection film 2, it is possible to design the antireflection film 2 having not only the antireflection function but also a function of making the ultraviolet irradiation degradation degree (X) to be 1.5% or less in the glass article 3.

In the antireflection film 2, by setting an upper limit of the film thickness per one layer to 200 nm, it is possible to suppress a reduction in the transmittance of visible light. Note that to set the film thickness per one layer of the antireflection film 2 to 5 nm or more, is for making the antireflection film 2 actually exist in a film shape and making the function of the antireflection film 2 to be sufficiently exhibited.

A thickness of the entire antireflection film 2 is preferably 200 to 450 nm. If the thickness of the antireflection film 2 exceeds 450 nm, there is a case where a manufacturing cost increases or it becomes difficult to apply the glass article 3 to a small-sized device or the like due to an increase in thickness of the entire glass article 3. The thickness of the antireflection film 2 is preferably 430 nm or less, and more preferably 400 nm or less. Further, if the thickness of the antireflection film 2 is less than 200 nm, it is sometimes not possible to obtain a reflection characteristic which is required for improving the transmittance of the glass substrate 1. The thickness of the antireflection film 2 is preferably 210 nm or more, and more preferably 220 nm or more.

The antireflection film 2 can be formed on the glass substrate 1 through a publicly-known film forming method. Concretely, the antireflection film 2 is formed by using a film forming method of a heating deposition method, a sputtering method, an ion assisted deposition (IAD) method, or the like. In particular, when a film with high abrasion resistance is formed as the antireflection film 2, it is preferable to use the sputtering method or the ion assisted deposition method, in order to obtain a dense film.

The glass article 3 formed of the glass substrate 1 and the antireflection film 2 has been described above while referring to FIG. 1. The glass article 3 can change the design of the glass substrate 1 and the antireflection film 2 within a scope not impairing the effects of the present invention. Further, the glass article 3 may have a member other than the glass substrate 1 and the antireflection film 2 within a scope not impairing the effects of the present invention.

For example, the glass article 3 may have, at a position between the glass substrate 1 and the antireflection film 2, an adhesion-strengthening film layer for increasing adhesiveness between the glass substrate 1 and the antireflection film 2. The glass article 3 may also have, other than the adhesion-strengthening film layer, an ultraviolet absorbing layer, an ultraviolet reflection layer, and the like for reducing damage to the glass substrate 1 due to ultraviolet rays. These ultraviolet absorbing layer and ultraviolet reflection layer may also be provided between the glass substrate 1 and the antireflection film 2, for example, and if the antireflection film 2 is the optical multilayer film, these layers may also be provided between layers of the optical multilayer film. In each of the cases, the ultraviolet absorbing layer and the ultraviolet reflection layer may also be designed to contribute to the antireflection function of the antireflection film 2 as a part of the antireflection film 2 while having the ultraviolet absorbing function and the ultraviolet reflecting function of the layers themselves, respectively.

The glass article of the present invention is the glass article using the glass substrate having the absorption in the ultraviolet region, the glass article suppressing the solarization and exhibiting the high visible light transmittance. Therefore, the glass article of the present invention can be used for, for example, an image display device such as a liquid crystal display (LCD), a liquid crystal on silicon (LCOS), an organic light emitting diode (OLED), a micro electro mechanical system (MEMS) display, or an electronic paper, which is required to have a high visible light transmittance and a solarization resistance.

EXAMPLES

Hereinafter, the present invention will be described in more detail by using Examples. The present invention is not limited at all to embodiments and Examples to be described below. Examples 1 and 2 are Examples, and an Example 3 is a glass substrate (Reference Example).

Examples 1, 2 and 3

The glass article 3 formed of the glass substrate 1 and the antireflection film 2 provided on one principal surface 1a of the glass substrate 1 illustrated in FIG. 1 was produced. Note that the number of layers of the antireflection film 2 was set to the number of layers to be described below for each Example.

As the glass substrate 1, a substrate with a plate thickness of 0.9 mm of non-alkali aluminosilicate glass manufactured by AGC Inc. was used. The Example 3 is the glass substrate itself. The antireflection film 2 with a layer configuration (a material, a film thickness of each layer) shown in Table 1 was formed on one principal surface 1a of the glass substrate 1 through the sputtering method, to thereby obtain glass articles of the Examples 1 and 2. In Table 1, a first layer is a layer which is brought into contact with the principal surface 1a of the glass substrate 1. Note that the film thickness of each layer of the antireflection film 2 is calculated from a result of measurement performed by using FE3000 manufactured by Otsuka Electronics Co., Ltd.

Regarding the obtained glass articles of the respective Examples and the glass substrate of the Example 3, a reflectance and a transmittance of light at a wavelength of 200 to 800 nm were measured in the following manner. Further, the ultraviolet irradiation degradation degree (X) was measured according to the above-described method. In addition, a test in which the irradiation time in the ultraviolet irradiation test was prolonged to five hours, was conducted. An average transmittance at the wavelength of 250 to 400 nm of the glass substrate and the glass article after the irradiation of five hours was set to $T_2$, and $T_0-T_2$ was set to an ultraviolet irradiation degradation degree (X)'.

(Reflectance)

The reflectance of the glass article 3 was measured by using FE3000 manufactured by Otsuka Electronics Co., Ltd. by irradiating light from the surface 2a side of the antireflection film 2, and the reflectance of the glass substrate 1 was measured by using FE3000 manufactured by Otsuka Electronics Co., Ltd. by irradiating light from the principal surface 1a side. The obtained measured values were directly used for evaluation as the reflectances.

(Transmittance)

Regarding the glass article 3, the transmittance of light which was incident from the surface 2a of the antireflection film 2 was measured on the principal surface 1b side of the glass substrate 1, by using U4100 manufactured by Hitachi, Ltd. Regarding the glass substrate 1, the transmittance of light which was incident from the principal surface 1a of the glass substrate 1 was measured on the principal surface 1b side of the glass substrate 1.

[Optical Characteristic of Glass Substrate]

Figure 4A:
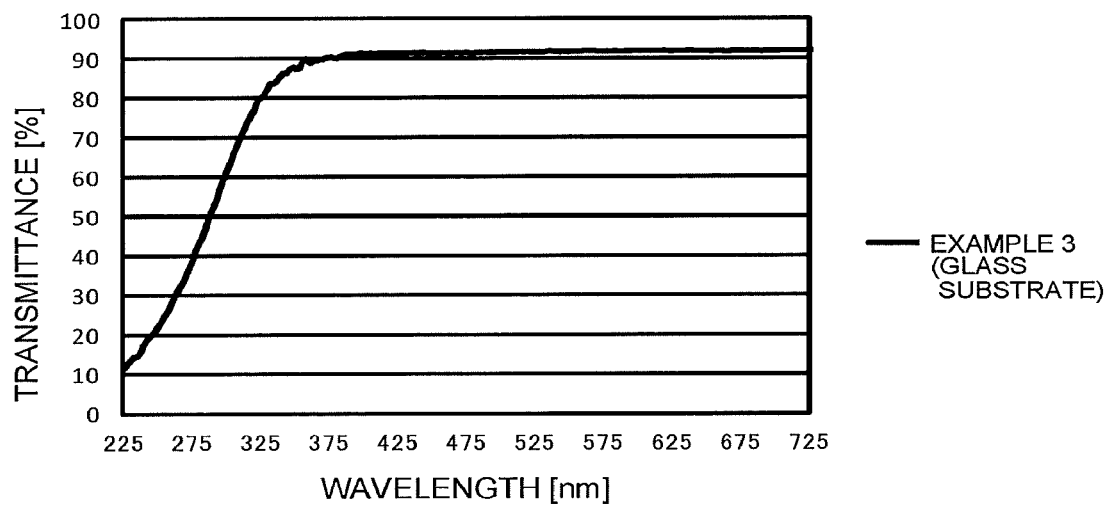
FIG. 4A is a graph illustrating a transmittance of a glass substrate of an Example 3 (Reference Example) in the Examples.

Regarding the glass substrate (Example 3) used for the glass article of each Example, an average transmittance (represented as Tvg, hereinafter) at the wavelength of 400 to 700 nm (the visible region) was 91.53%, and an average transmittance (represented as Tuvg, hereinafter) at the wavelength of 250 to 400 nm (the ultraviolet region) was 68.63%. A relationship between the wavelength and the transmittance of the glass substrate (Example 3) is illustrated in FIG. 4A.

Figure 4B:
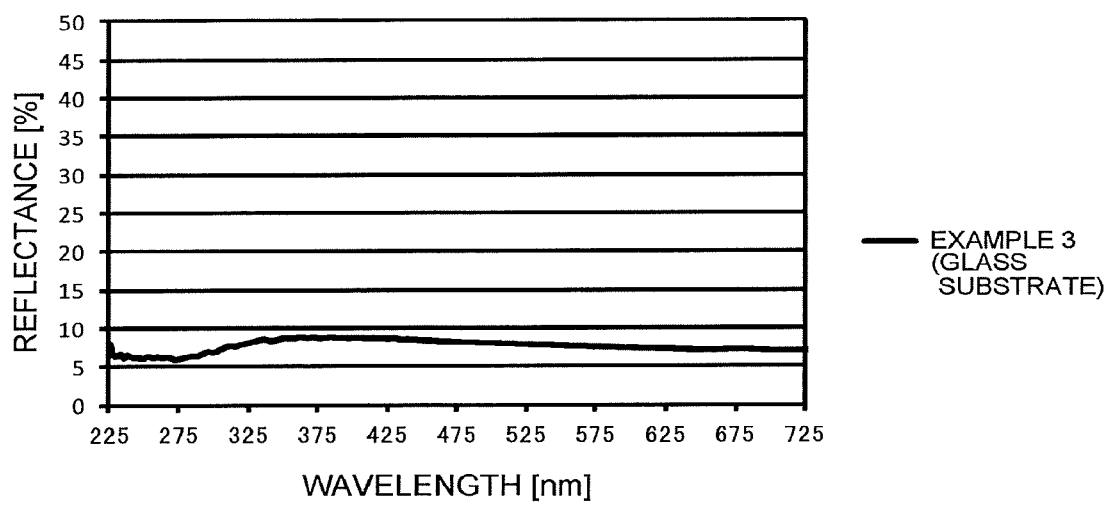
FIG. 4B is a graph illustrating a reflectance of the glass substrate of the Example 3 (Reference Example) in the Examples.

An average reflectance (represented as Rvg, hereinafter) at the wavelength of 400 to 700 nm (the visible region) of the glass substrate (Example 3) was 7.85%, and an average reflectance (represented as Ruvg, hereinafter) at the wavelength of 250 to 400 nm (the ultraviolet region) was 7.74%. A relationship between the wavelength and the reflectance of the glass substrate (Example 3) is illustrated in FIG. 4B.

Figure 4C:
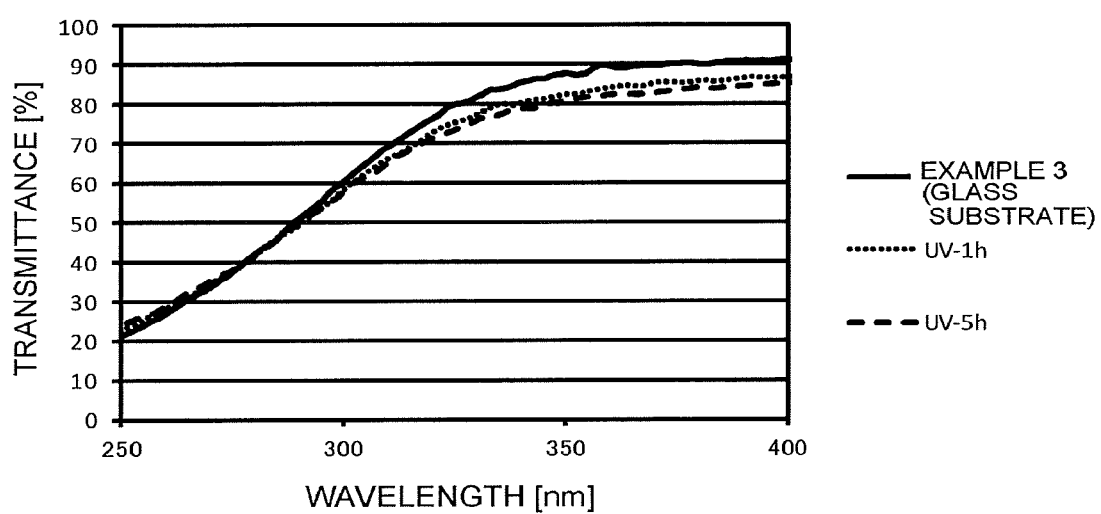
FIG. 4C is a graph illustrating a transmittance after performing an ultraviolet irradiation test of the glass substrate of the Example 3 (Reference Example) in the Examples.

The ultraviolet irradiation degradation degree (X) and the ultraviolet irradiation degradation degree (X)' of the glass substrate (Example 3) were 2.61% and 3.85%, respectively. The transmittances at the wavelength of 250 to 400 nm (the ultraviolet region) of the glass substrate (Example 3) before the irradiation of ultraviolet rays (Example 3 (glass substrate); solid line), after one hour of the irradiation of ultraviolet rays (UV-1h; dotted line), and after five hours of the irradiation of ultraviolet rays (UV-5h, broken line) are respectively illustrated in FIG. 4C. Besides, the transmittance characteristic, the reflectance characteristic, and the ultraviolet irradiation degradation degree of the glass substrate (Example 3) are shown in Table 1.

[Optical Characteristic Evaluation of Glass Articles of Examples 1 and 2]

Regarding the glass articles of the Examples 1 and 2, an average transmittance (represented as Tv, hereinafter) at the wavelength of 400 to 700 nm (the visible region), an average transmittance (represented as Tuv, hereinafter) at the wavelength of 250 to 400 nm (the ultraviolet region), an average reflectance (represented as Rv, hereinafter) in the visible region, and an average reflectance (represented as Ruv, hereinafter) in the ultraviolet region were determined. Besides, the ultraviolet irradiation degradation degree (X) and the ultraviolet irradiation degradation degree (X)' were determined similarly to the case of the above-described glass substrate. Results thereof are shown in Table 1 together with the configuration of the antireflection film 2.

Further, a degree at which the average transmittance in the visible region of the glass article was improved when compared to the average transmittance in the visible region of the used glass substrate was represented as a difference of the both (Tv−Tvg). A degree at which the average reflectance in the ultraviolet region of the glass article was improved when compared to the average reflectance in the ultraviolet region of the used glass substrate was represented as a difference of the both (Ruv−Ruvg). Results are shown in Table 1.

Figure 2A:
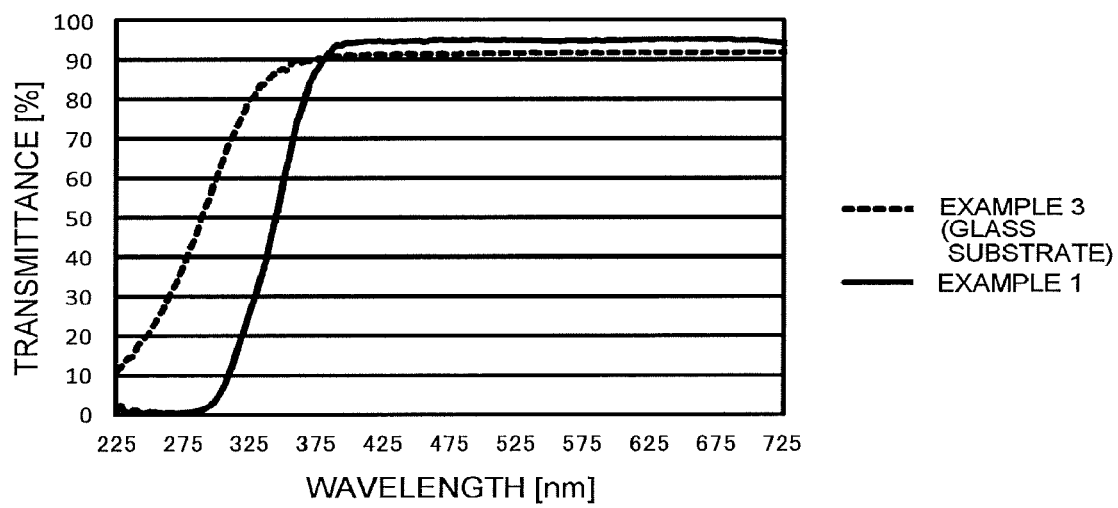
FIG. 2A is a graph illustrating a transmittance of a glass article of an Example 1 (Example) in Examples.
Figure 2B:
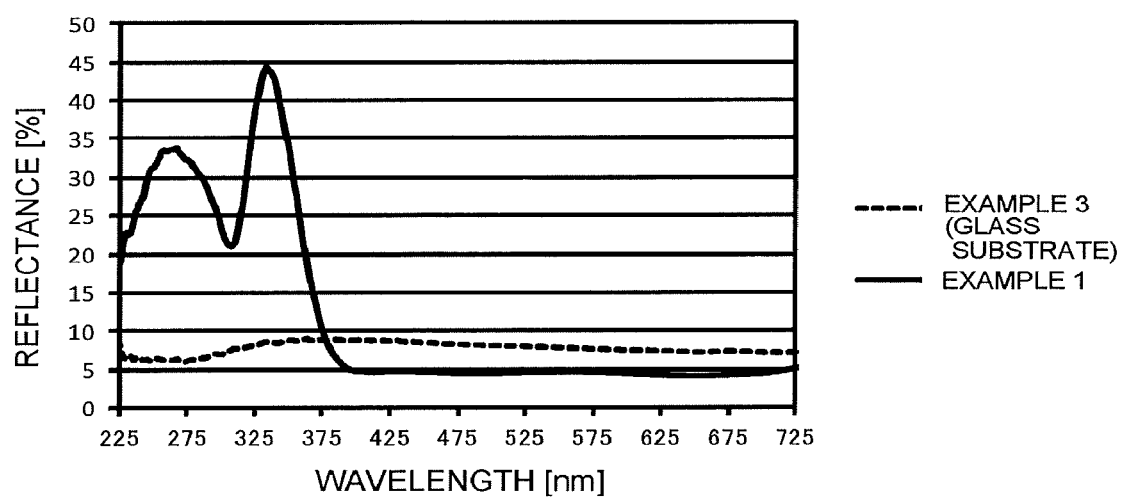
FIG. 2B is a graph illustrating a reflectance of light which is incident from an antireflection film side of the glass article of the Example 1 (Example) in the Examples.
Figure 2C:
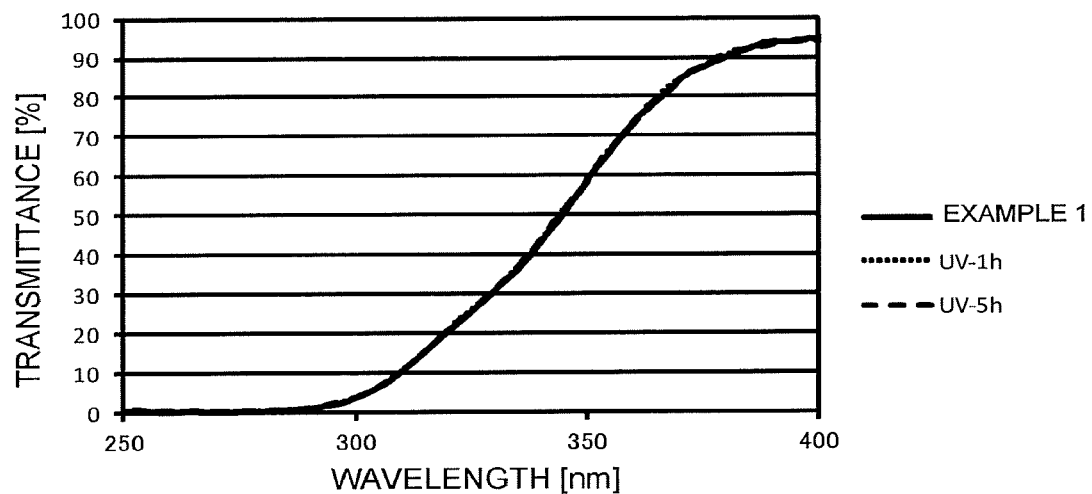
FIG. 2C is a graph illustrating a transmittance after performing an ultraviolet irradiation test of the glass article of the Example 1 (Example) in the Examples.
Figure 3A:
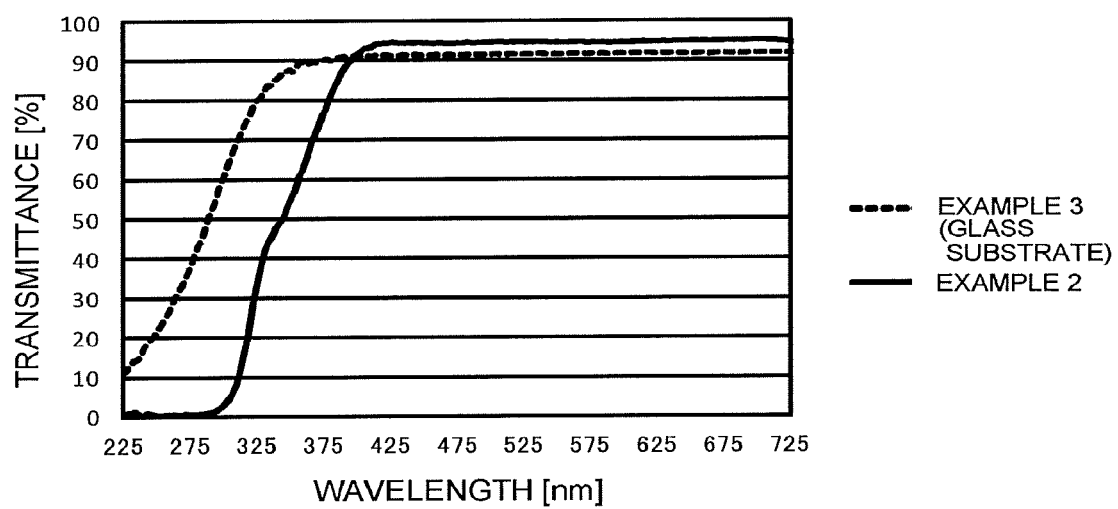
FIG. 3A is a graph illustrating a transmittance of a glass article of an Example 2 (Example) in the Examples.
Figure 3B:
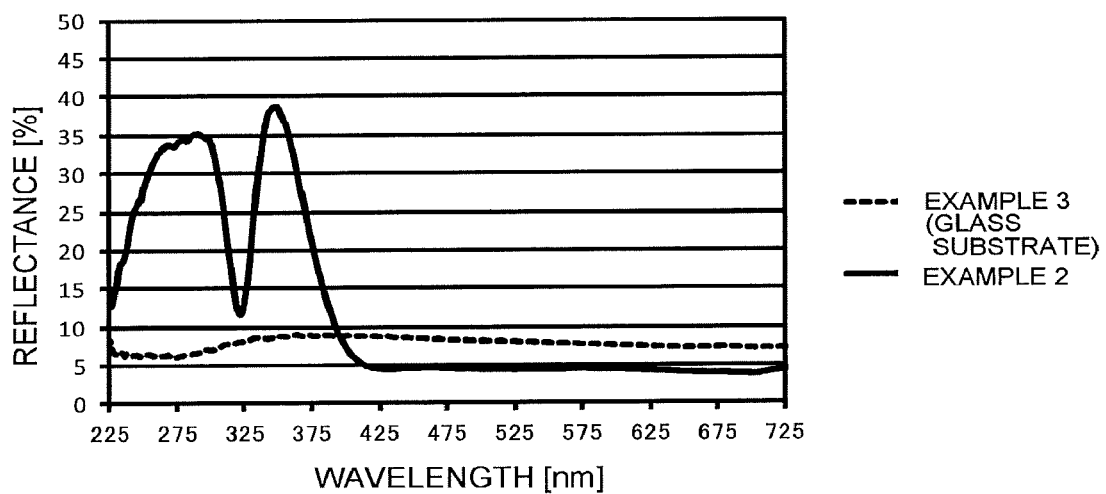
FIG. 3B is a graph illustrating a reflectance of light which is incident from an antireflection film side of the glass article of the Example 2 (Example) in the Examples.
Figure 3C:
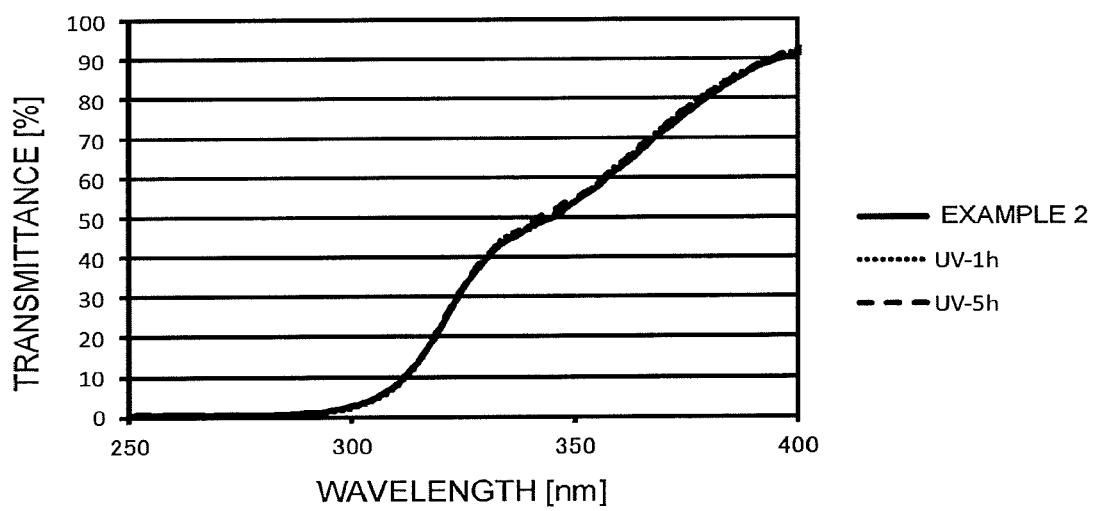
FIG. 3C is a graph illustrating a transmittance after performing an ultraviolet irradiation test of the glass article of the Example 2 (Example) in the Examples.

Relationships between the wavelengths and the transmittances in the glass articles of the Examples 1 and 2 are illustrated in FIG. 2A and FIG. 3A, respectively. Relationships between the wavelengths and the reflectances in the glass articles of the Examples 1 and 2 are illustrated in FIG. 2B and FIG. 3B, respectively. In the respective drawings, the transmittance or the reflectance of the glass substrate of the Example 3 is indicated by a broken line for comparison. The transmittances at the wavelength of 250 to 400 nm (the ultraviolet region) of the glass articles of the Examples 1 and 2 before the irradiation of ultraviolet rays (Example 1, Example 2; solid line), after one hour of the irradiation of ultraviolet rays (UV-1h; dotted line), and after five hours of the irradiation of ultraviolet rays (UV-5h, broken line) are respectively illustrated in FIG. 2C and FIG. 3C, respectively.

TABLE 1

|  |  |  | Example 1 | Example 2 | Example 3 |
|---|---|---|---|---|---|
| Layer configuration of antireflection film 2 | First layer | Material | $Nb_2O_5$ | $Nb_2O_5$ | — |
|  |  | Thickness [nm] | 15.75 | 14.96 | — |
|  | Second layer | Material | $SiO_2$ | $SiO_2$ | — |
|  |  | Thickness [nm] | 30.07 | 34.42 | — |
|  | Third layer | Material | $Nb_2O_5$ | $Nb_2O_5$ | — |
|  |  | Thickness [nm] | 53.45 | 59.98 | — |
|  | Fourth layer | Material | $SiO_2$ | $SiO_2$ | — |
|  |  | Thickness [nm] | 10.13 | 11.59 | — |
|  | Fifth layer | Material | $Nb_2O_5$ | $Nb_2O_5$ | — |
|  |  | Thickness [nm] | 40.61 | 40.61 | — |
|  | Sixth layer | Material | $SiO_2$ | $SiO_2$ | — |
|  |  | Thickness [nm] | 86.23 | 98.69 | — |
|  | Total film thickness [nm] |  | 236.24 | 260.25 | — |
| Optical characteristic | Average transmittance Tv at wavelength of 400 to 700 nm |  | 94.96 | 94.90 | 91.53 |

TABLE 1-continued

|  |  | Example 1 | Example 2 | Example 3 |
|---|---|---|---|---|
| [%] | Average transmittance Tuv at wavelength of 250 to 400 nm | 37.28 | 35.38 | 68.63 |
|  | Average reflectance Rv at wavelength of 400 to 700 nm | 4.41 | 4.47 | 7.85 |
|  | Average reflectance Ruv at wavelength of 250 to 400 nm | 25.99 | 27.09 | 7.74 |
|  | Ultraviolet irradiation degradation degree (X) | −0.17 | −0.38 | 2.61 |
|  | Ultraviolet irradiation degradation degree (X)' | −0.19 | −0.33 | 3.85 |
|  | Tv-Tvg | 3.43 | 3.37 | — |
|  | Ruv-Ruvg | 18.25 | 19.35 | — |

From Table 1, it can be understood that the glass articles obtained by the Example 1 and the Example 2 are glass articles in each of which the antireflection film is formed on the glass substrate which absorbs light at the wavelength of 250 to 400 nm (the ultraviolet region) and thus has the ultraviolet irradiation degradation degree (X) of greater than 1.5, and the ultraviolet irradiation degradation degree (X) in the glass article is 1.5% or less. Further, in the glass articles obtained by the Example 1 and the Example 2, the average transmittance in the visible region is higher than the average transmittance in the used glass substrate, as shown in Table 1. As described above, it can be understood that each of the glass articles obtained by the Example 1 and the Example 2 is a glass article in which the transmittance of the glass substrate is increased in the visible region, the ultraviolet irradiation degradation degree (X) is lowered, the solarization is suppressed, and the visible light transmittance is high.

What is claimed is:

1. A glass article, comprising: a glass substrate; and an antireflection film provided on at least one surface of the glass substrate, wherein:
    the glass substrate absorbs light at a wavelength of 250 to 400 nm which is incident from the surface; and
    the glass article has an ultraviolet irradiation degradation degree (X) of 1.5% or less,
    wherein the ultraviolet irradiation degradation degree (X) is $T_0-T_1$, where $T_0$ is an average transmittance of light at the wavelength of 250 to 400 nm which is incident from a surface of the antireflection film of the glass article in an initial state, and $T_1$ is an average transmittance of light at the wavelength of 250 to 400 nm which is incident from the surface of the antireflection film of the glass article after irradiating the surface of the antireflection film with ultraviolet rays for one hour by using a 400 W high-pressure mercury lamp with a main wavelength of 253.7 nm facing the surface of the antireflection film of the glass article at a distance of 20 cm.

2. The glass article according to claim 1, wherein
an average transmittance of light at the wavelength of 250 to 400 nm which is incident from the surface of the antireflection film with respect to the glass article is 40% or less, and an average reflectance of light at the wavelength of 250 to 400 nm which is incident from the surface of the antireflection film with respect to the glass article is 15% or more.

3. The glass article according to claim 1, wherein
the glass substrate has a lower average transmittance of light at the wavelength of 250 to 400 nm than an average transmittance of light at a wavelength of 400 to 700 nm, and an average transmittance of light at the wavelength of 250 to 400 nm of 70% or less, in the transmittances of lights which are incident from the surface, and
the glass article has an average reflectance of light at the wavelength of 400 to 700 nm which is incident from the surface of the antireflection film of 6% or less.

4. The glass article according to claim 1, wherein
the antireflection film is an optical multilayer film.

5. The glass article according to claim 4, wherein
the number of layers of the optical multilayer film is eight or less.

6. The glass article according to claim 4, wherein
the optical multilayer film includes an alternately-laminated part of a $SiO_2$ layer and a $Nb_2O_5$ layer.

7. The glass article according to claim 1, wherein
a thickness of the antireflection film is 200 to 450 nm.

* * * * *